June 3, 1969 AKIO KUMADA 3,447,217

METHOD OF PRODUCING CERAMIC PIEZOELECTRIC VIBRATOR

Filed Jan. 27, 1965

INVENTOR.
Akio Kumada

BY

H. Edward Meslems

United States Patent Office 3,447,217

Patented June 3, 1969

3,447,217
METHOD OF PRODUCING CERAMIC PIEZOELECTRIC VIBRATOR

Akio Kumada, Tokyo-to, Japan, assignor to Kabushiki Kaisha Hitachi Seisakusho, Tokyo-to, Japan, a joint-stock company of Japan Filed Jan. 27, 1965, Ser. No. 428,390
Claims priority, application Japan, Feb. 5, 1964, 39/5,743
Int. Cl. H04r *17/00*
U.S. Cl. 29—25.35 2 Claims

ABSTRACT OF THE DISCLOSURE

Piezoelectric vibrators and method of producing the same, comprising, as integral structure, lead titanate-zirconate with an intermediate layer formed therein by chemical reduction and ensuing oxidation.

This invention relates to piezoelectric vibrators and more particularly to a new ceramic piezoelectric vibrator having highly desirable characteristics, and to a method of producing the same.

In recent years piezoelectric vibrators of the so-called Bimorph type (for example, trademark name Bimorph, Brush Development Company) have been widely used as vibrators for pickups.

Bimorph type piezoelectric vibrators, however, have exhibited certain difficulties arising principally from their construction as will be more fully described hereinafter. It is a general object of the present invention to overcome these difficulties.

More specifically, it is an object to provide a piezoelectric vibrator of integral construction which does not require mechanical bonding and electrical connection of surfaces of separate piezoelectric members.

It is another object to provide a method of producing the piezoelectric vibrator according to the invention.

Other objects as well as numerous advantages of the invention will become apparent from the following description.

According to the present invention there is provided a piezoelectric vibrator comprising as an integral structure lead titanate-zirconate having therewithin an intermediate layer formed by chemical reduction of said lead titanate-zirconate.

According to the present invention there is further provided a method for producing piezoelectric vibrators which comprises subjecting lead titanate-zirconate to chemical reduction, oxidizing the surface of said lead titanate-zirconate to form thereon an oxidized layer, and then polarizing said oxidized layer.

According to the present invention there are provided modifications of the ceramic piezoelectric vibrator and a method for production thereof as stated above.

The nature, principle, and details of the invention will be more clearly apparent from the following description taken in conjunction with the accompanying drawings, in which like parts are designated by like reference numerals and in which.

Figure 1:
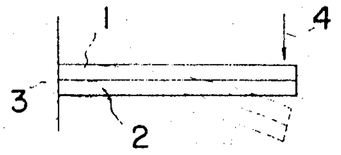
FIG. 1 is a simplified diagram showing one form of application of a piezoelectric vibrator.

A piezoelectric vibrator of Bimorph type has a construction wherein, for example, two unit vibrators of the same direction of the piezoelectric axis are bonded together with mutually opposite orientation of the electric axes so as to assume mutually a mirror reflection relationship. One form of practical application of this vibrator is the bending type which, as shown in FIG. 1, comprises piezoelectric elements 1 and 2 which are bonded together as mentioned above. When a piezoelectric vibrator of this arrangement is placed in a fixed state at one end 3, and a force 4 is applied at the other end as indicated, the element 1 is subjected to tensile stress, and the element 2 is subjected to compressive stress. Since the orientations of the electric axes of the piezoelectric elements 1 and 2 are mutually reversed, the electric field directions of the two vibrators become the same, and it is possible to cause the generation of a large piezoelectric output.

Since the thicknesses, widths, and lengths of these piezoelectric vibrators are subject to limitations due to the use, strength of material, and resonance frequency, and since, moreover, the thicknesses of the piezoelectric elements are subject to limitation due to electric capacitance, piezoelectric vibrators satisfying both requirements are necessary. That is, in the case where large electric capacitance and high resonance frequency are required, it is necessary to reduce the thicknesses of the piezoelectric elements. In such a case, since the piezoelectric elements become thin, it is the ordinary practice to interpose a good conductor between the two elements to support said elements, as clearly described in the U.S. patent to Howatt, No. 2,640,-165, for example. For the piezoelectric elements, ceramic piezoelectric elements such as $BaTiO_3$ are principally used, and the principal method of bonding together these elements is by soldering. However, because soldering is so resorted to for bonding, the adhesive strength is weak, and the output loss at the bonded surface is not negligible. Consequently, it has not been possible to obtain good results in vibration characteristics.

Furthermore, since metal plates are principally used for the aforementioned good conductor, their permanent deformations due to deflections are large, and, moreover, differences in properties such as coefficient of expansion and modulus of elasticity occur because of differences in materials. Consequently, satisfactory vibration characteristics could not be obtained in the case of such vibrators. In addition, temperature rise due to soldering during the fabrication process gives rise to warping and like deformation in many instances, whereby it has been difficult to produce products of good quality by the prior art.

The present invention contemplates overcoming the above described difficulties by providing a piezoelectric vibrator comprising lead titanate-zirconate having therewithin an intermediate chemically reduced layer, as described hereinbelow in detail with respect to preferred embodiments of the invention.

Figure 2:
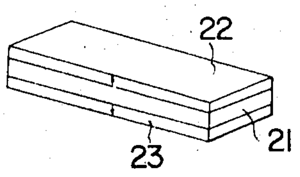
FIGS. 2 and 3 are simplified perspective views respectively showing preferred embodiments of the piezoelectric vibrator according to the invention.
Figure 3:
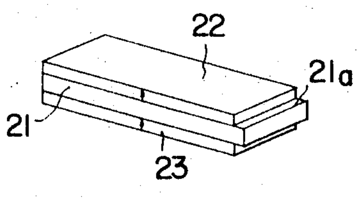

Referring to FIGS. 2 and 3 showing the fundamental construction of the piezoelectric vibrator according to the invention, the vibrator structure comprises lead titanate-zirconate layers (hereinafter referred to as "oxide layers") 22 and 23 and an intermediate layer 21 consisting of lead titanate-zirconate which has been chemically reduced. The arrows shown indicate polarization directions. In a modified form as shown in FIG. 3, the oxide layers at one end of the piezoelectric vibrator are removed to expose a part $\mathbf{21}_a$ of the intermediate layer, thereby to facilitate attachment of lead wires in the case where the oxide layers 22 and 23 are to be connected in parallel.

The method of fabricating the piezoelectric vibrator of the present invention will now be described with respect to the following preferred example.

A piece of lead titanate-zirconate is fabricated into a thin sheet of 650-micron thickness, which is treated for 15 minutes at 800 degrees C. in a stream of hydrogen gas to reduce the entire sheet. Next, the sheet is oxidized for 2 hours at 650 degrees C. in a stream of oxygen gas, whereupon oxidation progresses inwardly from the sheet surface, and an oxidized layer of 150-micron depth is formed on the surface. Then the sheet is cut to the specified width and length. Thereafter, a voltage is applied across the intermediate layer 21 and the oxide layers 22 and 23 to effect polarization, whereupon the complete piezoelectric vibrator is obtained.

Figure 4:
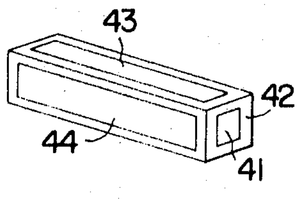
FIGS. 4 and 5 are similarly simplified perspective views respectively showing other embodiments of the invention.
Figure 5:
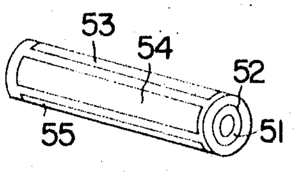

By a similar process, it is possible to produce piezoelectric vibrators for stereophonic, high-fidelity record players as shown in FIGS. 4 and 5. These vibrators comprise, respectively, reduced layers 41 and 51, oxidized layers 42 and 52, and electrodes 43, 44, 53, 54, and 55 secured onto the surfaces of respective oxidized layers. That is, these piezoelectric vibrators can be produced by subjecting reducible lead titanate-zirconate of the required sizes and shapes, of square bar shape in the case shown in FIG. 4 and of hollow cylindrical bar shape in the case shown in FIG. 5, to reduction and oxidation treatments similar to those described above, attaching electrodes symmetrically on respective surfaces of the oxidized layers, and carrying out polarization. In the case of a hollow cylindrical shape as illustrated in FIG. 5, its inner surface may be reduced to the required depth after the ceramic piezoelectric material has been formed into a cylinder.

Figure 6:
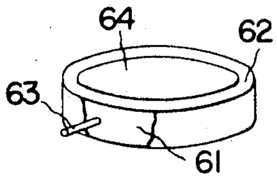
FIGS. 6 and 7 are simplified perspective views respectively showing further embodiments of the invention.

In another embodiment of the invention as shown in FIG. 6, a lead titanate-zirconate in the form of a flat plate is subjected to reduction treatment, and then the entire surface layer thereof is oxidized. As a result, there are formed a reduced layer 61 and an oxidized layer 62. Then, there are provided an electrode 64 by adhering a thin metal film on the oxidized layer 62 and another electrode 63 by attaching a lead piece onto the reduced layer 61.

Figure 7:
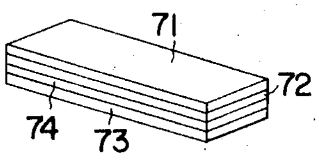

In a further embodiment of the invention as shown in FIG. 7, one surface of each of two piezoelectric elements is reduced, and then the reduced surfaces of the elements are bonded together. The vibrator so produced has oxidized layers 71 and 73, each consisting of a single layer of oxidized piezoelectric material, and reduced layers 72 and 74. Although it is necessary to bond the two reduced layers 72 and 74 in this case, there is almost no adverse effect on the characteristics because these two layers are bonded without intervening matter along the neutral plane of the entire structure, and it is possible to produce a piezoelectric vibrator of bimorph type.

The production of a vibrator of the above described construction is made possible since, by reducing lead titanate-zirconate, its resistance can be readily lowered, whereby a resistance of the order of $10^{-1}$ ohm/cm. can be obtained, and a thermo-electromotive force of 30 microvolt/° C. and a temperature coefficient of $10^{-2}$ or less can be obtained.

Furthermore, the present invention makes possible the prevention of deterioration of characteristics of the vibrator due to the heat treatment unavoidably accompanying soldering and affords simplification of the fabrication process. Moreover, oxidized layers of any desired thickness ranging from 320 microns to a number of angstroms can also be readily formed, particularly extremely thin bimorph vibrators being easily produced by the method of this invention.

Another advantage of the invention is that, since the crystalline structure of lead titanate-zirconate undergoes almost no change with treatment, that is, in the oxidized layer and the reduced layer, properties such as the coefficient of expansion and modulus of elasticity also undergo almost no change. Accordingly, the disadvantages due to differences in these properties which heretofore caused problems have been completely eliminated.

A further advantage is that the production of piezoelectric vibrators for stereophonic, high-fidelity sound equipment is simplified and facilitated and does not require complicated assembly procedures.

Thus, the present invention provides a piezoelectric vibrator having numerous advantageous features which could not be attained by known vibrators of similar type. The vibrator of the present invention, moreover, can be produced simply and easily at relatively low cost and is effectively applicable to a wide variety of devices such as, for example, earphones, loudspeakers, microphones, and telephones.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A method for producing piezoelectric vibrators which comprises: chemically reducing by subjecting to a hydrogen atmosphere at elevated temperature one matching surface of each of two lead titanate-zirconate elements and then joining said elements by bonding them together without intervening matter at their respective reduced matching surfaces.

2. A method according to claim 1, in which a voltage is further applied between said chemically reduced layers of said lead-titanate-zirconate elements and the oxidized layers thereof to effect polarization of said oxidized layers.

References Cited

UNITED STATES PATENTS

| | | | |
|---|---|---|---|
| 2,633,543 | 3/1953 | Howatt | 310—9.8 |
| 2,640,165 | 5/1953 | Howatt | 310—8.1 |
| 2,659,829 | 11/1953 | Baerwald | 310—8.5 |
| 2,768,421 | 10/1956 | Gravley | 29—25.35 |
| 2,928,163 | 3/1960 | Berlincourt et al. | 29—25.35 |
| 2,893,107 | 7/1959 | Anderson | 29—25.35 |
| 2,493,461 | 1/1950 | MacConnell | 29—25.35 |
| 2,479,286 | 8/1949 | Wolfskill | 29—25.35 |
| 2,376,219 | 5/1945 | Winslow | 29—25.35 |

JOHN F. CAMPBELL, *Primary Examiner.*

P. M. COHEN, *Assistant Examiner.*

U.S. Cl. X.R.

310—8